United States Patent
Choi et al.

(10) Patent No.: US 10,091,546 B2
(45) Date of Patent: *Oct. 2, 2018

(54) SECURE INTERNAL CONTROL FOR ENCRYPTING VIDEO DATA

(71) Applicant: Lattice Semiconductor Corporation, Portland, OR (US)

(72) Inventors: Hoon Choi, Mountain View, CA (US); Wooseung Yang, San Jose, CA (US); Ju Hwan Yi, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,754

(22) Filed: Mar. 17, 2017

(65) Prior Publication Data

US 2017/0195719 A1 Jul. 6, 2017

Related U.S. Application Data

(63) Continuation of application No. 14/620,973, filed on Feb. 12, 2015, now Pat. No. 9,628,855.

(Continued)

(51) Int. Cl.
*H04N 21/438* (2011.01)
*H04L 29/06* (2006.01)
(Continued)

(52) U.S. Cl.
CPC ..... *H04N 21/4408* (2013.01); *H04L 63/0428* (2013.01); *H04N 21/438* (2013.01); *H04N 21/43635* (2013.01)

(58) Field of Classification Search
CPC ........... H04N 21/4408; H04N 21/4363; H04N 21/438; H04N 21/43635
(Continued)

(56) References Cited

U.S. PATENT DOCUMENTS 7,295,578 B1 11/2007 Lyle et al.
8,230,118 B2 * 7/2012 Toba ...................... G09G 5/006
710/2

(Continued)

OTHER PUBLICATIONS

"HDCP and EDID Demystified"—Xiaozheng Lu, Luxi Electronics Corp., Dec. 12, 2012 http://www.luxielectronics.com/attachments/File/HDCP_and_EDID_Demystified.pdf.*

(Continued)

*Primary Examiner* — Randy Scott
(74) *Attorney, Agent, or Firm* — Fenwick & West LLP

(57) ABSTRACT

In one aspect, a video processing device includes a processor and a transmitter, for example implemented as separate integrated circuits on a printed circuit board. Pins on the processor are coupled to pins on the transmitter via a data channel, for example conductive leads on the printed circuit board. Video data is transmitted from the processor to the transmitter via this data channel, which is high speed enough to accommodate video data. The transmitter also includes an encryption engine used to encrypt the video data. Encryption control data, which determines the encryption to be applied, is transmitted from the processor to the transmitter over the same data channel as the video data. This is more secure than transmitting the encryption control data over a slower separate data channel, because the high speed video channel is harder to tamper with.

20 Claims, 5 Drawing Sheets

Related U.S. Application Data

(60) Provisional application No. 62/061,630, filed on Oct. 8, 2014.

(51) Int. Cl.
 *H04N 21/4408* (2011.01)
 *H04N 21/4363* (2011.01)

(58) Field of Classification Search
 USPC .......... 713/150, 165, 166, 176; 380/44, 239, 380/277, 280
 See application file for complete search history.

(56) References Cited

U.S. PATENT DOCUMENTS

| | | | |
|---|---|---|---|
| 2004/0047470 A1* | 3/2004 | Candelore | H04N 5/783 380/240 |
| 2005/0078944 A1 | 4/2005 | Risan et al. | |
| 2005/0243208 A1 | 11/2005 | Huang | |
| 2006/0235798 A1* | 10/2006 | Alkove | G06F 21/10 705/59 |
| 2007/0242062 A1 | 10/2007 | Guo et al. | |
| 2007/0291938 A1 | 12/2007 | Rao et al. | |
| 2011/0285917 A1* | 11/2011 | Murase | H04N 21/43615 348/723 |

OTHER PUBLICATIONS

"Side Channel Cryptanalysis"—Samyde et al, Catholic Univ. of Louvain, Sep. 2002 http://www.lsv.ens-cachan.fr/.about.goubault/SECI-02/Final/acte- s-seci02/pdf/016-samyde_english.

"High-Bandwidth Digital Content Protection System," Revision 1.4, Jul. 8, 2009, Digital Content Protection LLC, 90 pages.

"High-Bandwidth Digital Content Protection System: Mapping HDCP to HDMI," Revision 2.2, Feb. 13, 2013, Digital Content Protection LLC, 72 pages.

"High-Bandwidth Digital Content Protection System: Interface Independent Adaptation," Revision 2.2, Oct. 16, 2012, Digital Content Protection LLC, 78 pages.

United States Office Action, U.S. Appl. No. 14/620,973, dated Aug. 9, 2016, 13 pages.

United States Office Action, U.S. Appl. No. 14/620,973, dated Mar. 28, 2016, 10 pages.

* cited by examiner

SECURE INTERNAL CONTROL FOR ENCRYPTING VIDEO DATA

CROSS-REFERENCE TO RELATED APPLICATION(S)

This application is a continuation of U.S. patent application Ser. No. 14/620,973, "Secure Internal Control for Encrypting Video Data;" which claims priority under 35 U.S.C. § 119(e) to U.S. Provisional Patent Application Ser. No. 62/061,630, "Secure Control Communication between an Application Processor and a Transmitter," filed Oct. 8, 2014. The subject matter of all of the foregoing is incorporated herein by reference in their entirety.

BACKGROUND

1. Field of the Disclosure

This disclosure relates generally to video data processing and transmission, and more particularly, to the encryption of video data and transmission of encrypted video data.

2. Description of the Related Art

Consumer video processing devices, e.g., smart phones, can transmit high-definition video data to a display device for playback, e.g., on an HDTV. In some cases, the video data is required to be encrypted before transmission to the playback device. Somewhere, within the device, the required level of encryption is specified to an encryption engine and then that level of encryption is applied. However, if the internal structure of the device is not secure, the device may be vulnerable to tampering. The encryption level to be applied could be changed without authorization, resulting in transmission of video data that is unencrypted or underencrypted.

Thus, there is a need for a more secure internal control of the encryption function.

SUMMARY

Embodiments of the present disclosure overcome the limitations of the prior art by providing a video processing device, in which encryption control data is provided to the internal encryption engine using the same high speed internal data channel as used to provide the video data.

In one embodiment, a video processing device includes a processor and a transmitter, for example implemented as separate integrated circuits on a printed circuit board. Pins on the processor are coupled to pins on the transmitter via a data channel, for example conductive leads on the printed circuit board. Video data is transmitted from the processor to the transmitter via this data channel, which is high speed enough to accommodate video data. The transmitter also includes an encryption engine used to encrypt the video data. Encryption control data, which determines the encryption to be applied, is transmitted from the processor to the transmitter over the same data channel as the video data. This is more secure than transmitting the encryption control data over a slower separate data channel, because the high speed video channel is harder to tamper with.

Other aspects include components, devices, systems, improvements, methods, processes, applications and other technologies related to the foregoing.

BRIEF DESCRIPTION OF THE DRAWINGS

The present disclosure has other advantages and features which will be more readily apparent from the following detailed description of the disclosure and the appended claims, when taken in conjunction with the accompanying drawings, in which:

The figures depict embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
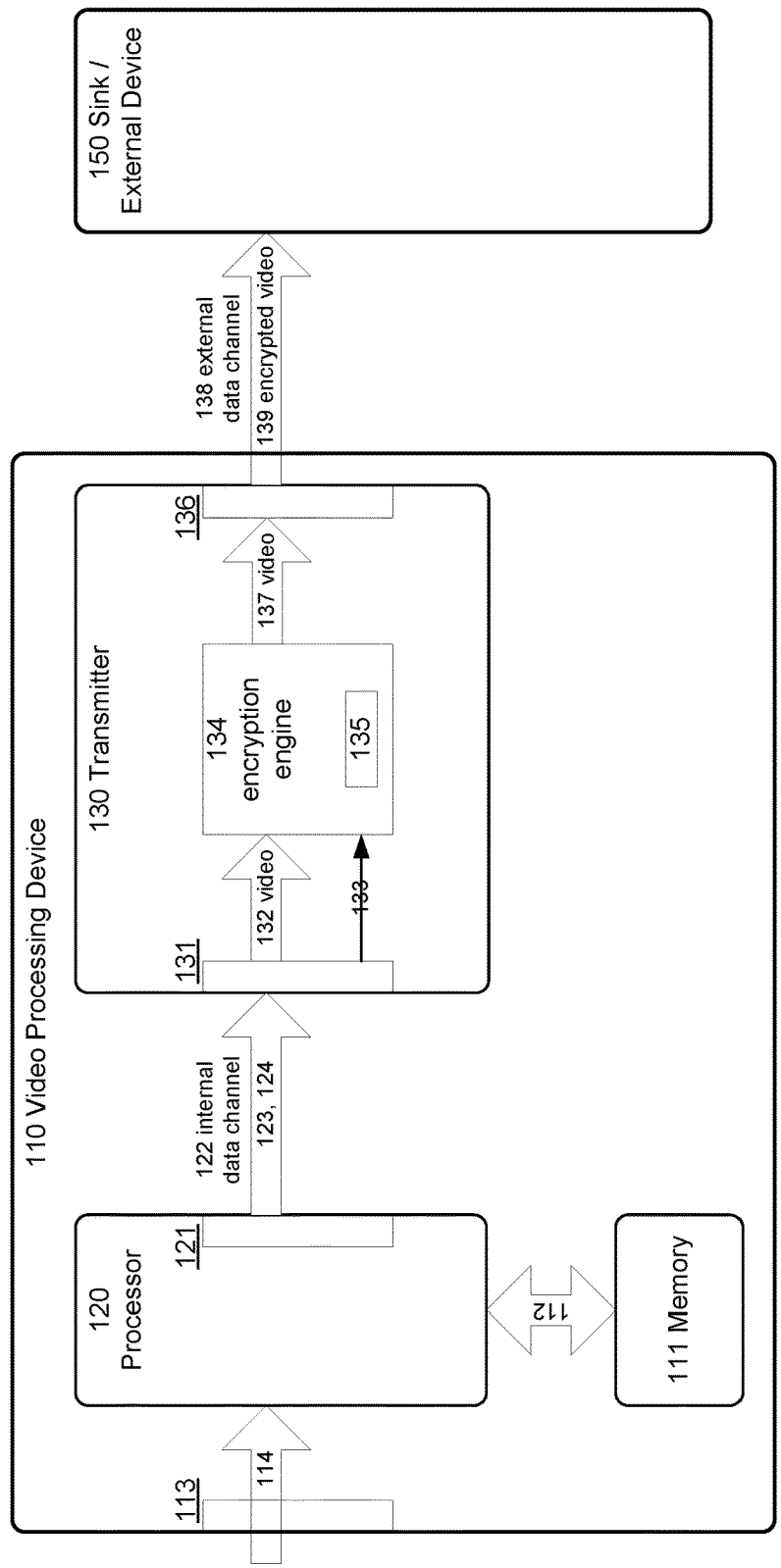
FIG. 1 is a block diagram of a system using some embodiments.

FIG. 1 is a block diagram of a system using some embodiments. A video processing device 110 transmits video data 139 to a sink/external device 150 via an external data channel 138. The video data 139 is supposed to be encrypted by the video processing device 110 before transmission to the sink 150. If the video processing device 110 does not encrypt the video when it is supposed to, the video data 139 may be transmitted without encryption or with inadequate encryption, resulting in adverse consequences. Various embodiments of this disclosure are advantageous to better ensure that the video data 139 is properly encrypted.

The video processing device 110 includes a processor 120 and a transmitter 130, which typically are implemented as separate integrated circuits within device 110. In certain embodiments, the video processing device 110 may be a mobile phone, a tablet, or some other type of hand held smart device. Other examples include various video transmitting devices, such as notebook computer or other personal computer, DVD player, Blu-ray player, AV receiver, game console, etc. The processor 120 communicates to the transmitter 130 via internal data channel 122, which may be metal leads on a printed circuit board connecting corresponding pins on the two integrated circuits 120,130. The interface to data channel 122 on the processor 120 will be referred to as the data transmit interface 121, and the interface on the transmitter 130 will be referred to as the data receive interface 131. Unencrypted video data 123 is transferred from the processor 120 to the transmitter 130 via the internal data channel 122. The internal data channel 122 is capable of supporting high speed video data transmission and is therefore generally less vulnerable to attack than lower speed channels between the processor 120 and transmitter 130. In various embodiments, the internal data channel 122 may be implemented as several lanes and is capable of bandwidths of at least 2 Gbps in the aggregate over all lanes. Using HDMI as an example, HDMI is typically implemented as three lanes. For standard definition (SD), HDMI supports 0.75 Gbps per lane or a total of 2.25 Gbps of video data. For high definition (HD), HDMI supports 1.5 Gbps per lane or a total of 4.5 Gbps. For 4K definition, HDMI supports 6 Gbps per lane or a total of 18 Gbps.

The transmitter 130 further includes an encryption engine 134 coupled to the data receive interface 131, and a data output interface 136 coupled to the encryption engine 134. The data path for video within the transmitter 130 is the following. Unencrypted video data is received at data receive interface 131, it is encrypted by encryption engine 134, and then encrypted video data is output from data output interface 136. The encryption engine 134 encrypts the unencrypted video data 132 in accordance with encryption control data 124/133.

The encryption control data 124 is provided to the encryption engine 134 for specifying a level of encryption to be applied by the encryption engine 134 to the unencrypted video data 132. In other words, the encryption control data determines the level of encryption to be applied to the unencrypted video data 123. The level of encryption is selected from a predetermined set of possible levels of encryption, including a level of no encryption. In the HDMI/HDCP example, the possible levels of encryption include HDCP 2.2, HDCP 1.4 and no encryption. In one embodiment, the encryption engine 134 may include a register 135 to store the level of encryption to be applied by the encryption engine 134.

The encryption control data 124 is transferred from the processor 120 to the transmitter 130 via the same internal data channel 122 as the unencrypted video 123. In the HDMI example, the encryption control data (and other audio and auxiliary data) can be transmitted during data island periods. In HDMI, a data island period occurs during the horizontal or vertical blanking intervals, i.e., between the periods when the video data are transmitted. The encryption control data 124 typically is much lower bandwidth than the video 123, so transmission of the encryption control data 124 does not require the high speed transmission of the internal data channel 122. However, transmission on a lower speed channel between the two chips 120, 130 makes the encryption more susceptible to interception, spoofing or other tampering. Within the transmitter 130, the encryption control data 133 may be separated from the video 132 and transmitted along a separate channel to the encryption engine 134.

After encryption, the data output interface 136 transmits the encrypted video data 137 to an external data channel 138. The external data channel 138 is coupled to a sink/external device 150, e.g., an HDTV, which decrypts and renders the content of the encrypted video data 139 for display. In various embodiments, the external device 150 may be any external display device suitable for display of the video, e.g., monitor, AV receiver, tablet, etc.

In one embodiment, the data transmitted by the data output interface 136 is high-definition video data and/or in compliance with High-Definition Multimedia Interface (HDMI) or Mobile High-Definition Link (MHL) standards and the encryption engine 134 is a High-bandwidth Digital Content Protection (HDCP) encryption engine. In other embodiments, the data transmitted by the data output interface 136 is in compliance with other specifications such as DisplayPort using HDCP encryption, Miracast (or other WiFi standards) using HDCP encryption, and USB using HDCP encryption. Other types of encryption may also be used.

As an additional function, the device 110 may check if the sink/external device 150 supports a required, minimum level of encryption specified by the encryption control data. If the device 110 determines that the sink/external device 150 does not support the minimum level of encryption, the transmitter 130 may be configured to not transmit data over the external data channel 138.

The video data for the processor 120 may come from many data sources, some of which are shown in FIG. 1. For example, video data 114 may be received from an external video data source (not shown), via a video port 113 to a wired or wireless connection. Alternately, video data 112 may be accessed from a memory or other storage medium 111. The memory 111 may be read-only or be both readable and rewritable. In the embodiment shown in FIG. 1, the memory is part of the video processing device 110. In other embodiments, the memory 111 may be external to the video processing device 110 and/or removable. For example, the memory 111 may be a USB drive or hard disk, or a blue-ray player or any other video player with an optical disc drive or other types of storage.

Figure 2:
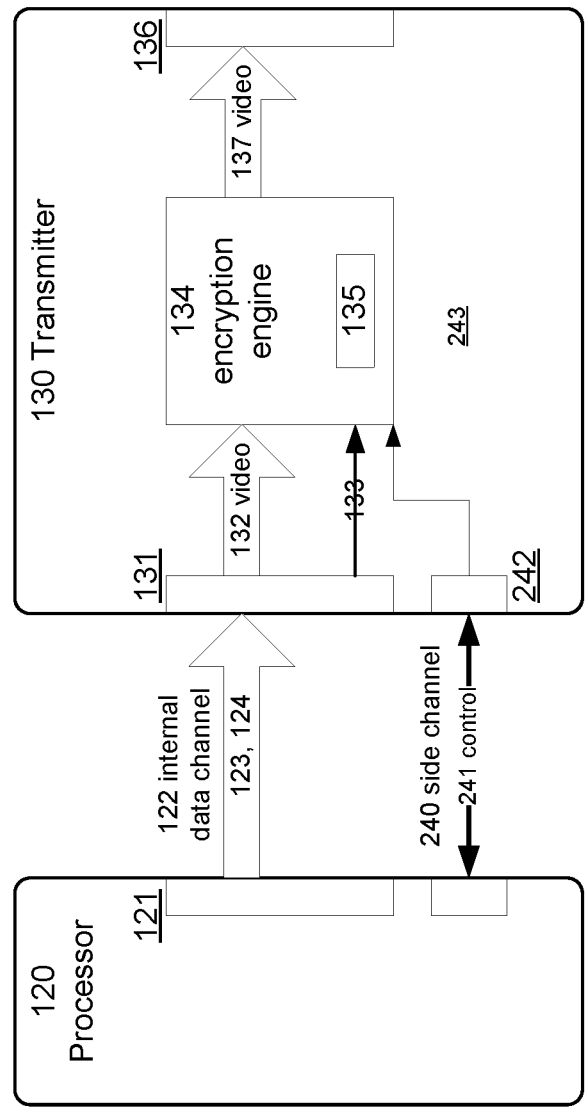
FIG. 2 is a block diagram showing a processor and a transmitter according to another embodiment.

FIG. 2 is a block diagram showing a processor and a transmitter according to another embodiment of the disclosure. This embodiment further includes a side channel 240 between the processor 120 and the transmitter 130 for the transmission of control signals 241 between the two. The interface on the transmitter 130 will be referred to as the control interface 242. The control signals 241 are used to control operation of the transmitter 130. The control signals 241 may also include status signals from the encryption engine 134 to the processor 120 via the side channel 240. Alternatively or additionally, in FIG. 2, the determination of whether a sink/external device (not shown in FIG. 2) supports the minimum level of encryption may be indicated in status signals transmitted via the side channel 240.

The side channel 240 is separate from and of lower speed than the data channel 122. In the HDMI example, the side channel 240 typically has an aggregate data rate of 100 Kbps-1 Mbps, while the data channel 122 has an aggregate data rate of 750 Mbps and often much more. The data channel 122 is typically at least 700 times higher data rate than the side channel 240, and may be 1,000 times higher data rate or even 10,000 times higher data rate. In another embodiment, the side channel 240 is an I2C bus. In yet another embodiment, the side channel 240 is a shared bus while the data channel 122 is a point-to-point link.

It might seem that the encryption control data 124 would more appropriately be transmitted over the side channel 240, rather than over the data channel 122. However, the side channel typically is lower speed than the data channel 122 and therefore more susceptible to tampering. This is especially true if the side channel 240 is a shared bus while the data channel 122 is a point-to-point link.

Consider the following scenario where the encryption process is compromised. The side channel 240 is a bus shared with another device (not shown in FIG. 2) connected thereto. In addition to the control signals 241 transmitted by the side channel 240, the processor 120 also transmits the encryption control data 124 over the side channel 240 instead of over the internal data channel 122. The transmitter 130 uses the level of encryption specified by the encryption control data 124 to apply encryption to the video data 132. If the other device having access to the side channel 240 modifies or tampers with the encryption control data 124, for example changing the level of encryption from HDCP 2.2 to no encryption, the transmitter 130 will be misinformed. In that situation, the transmitter 130 will not encrypt the video data and consequently will transmit it without encryption. This results in unencrypted video data being transmitted outside of the video processing device, when it should be transmitted using HDCP 2.2. This is a security problem.

This inadvertent situation is mitigated in FIGS. 1 and 2 because the encryption control data 124 is not transmitted via the side channel 240. Instead, it is transmitted only via the internal data channel 122, which is not shared with or otherwise accessible by other devices in the video processing device. Additionally, the internal data channel 122 has a much higher transmission speed than the side channel 240, making it more difficult to be tampered with. Thus, using only the internal data channel 122 to transmit the encryption control data 124 improves encryption security.

Figure 3:
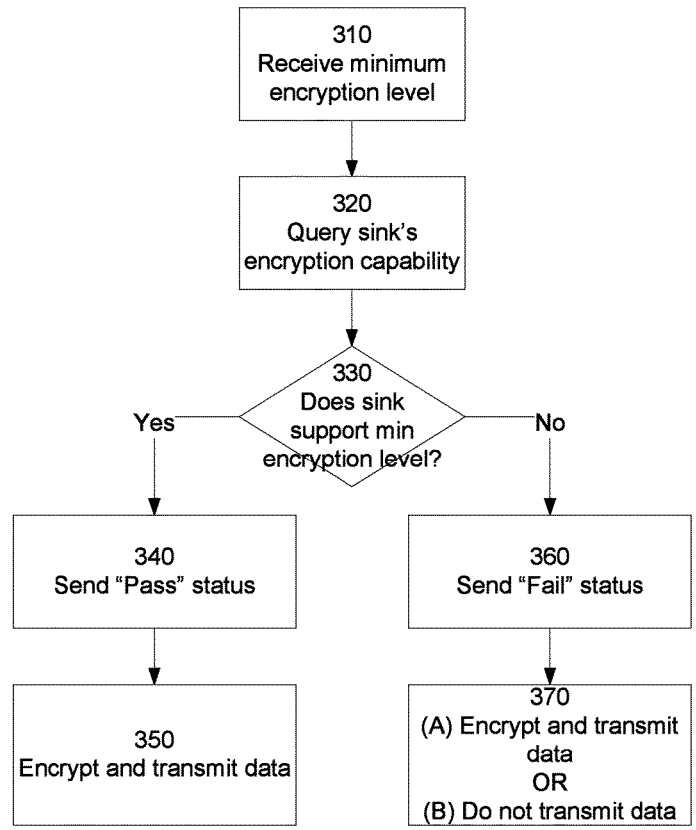
FIG. 3 is a flow diagram illustrating status reporting.

Now refer to FIG. 3, a flow diagram illustrating status reporting regarding whether a sink/external device supports a minimum encryption level. The transmitter 130 receives 310 a minimum encryption level specified by the encryption control data to be applied by the encryption engine 234. The transmitter 130 queries 320 the sink/external device's encryption capability and determines 330 whether the sink/external device supports the minimum encryption level, respectively. If the sink/external device supports the minimum encryption level, a "Pass" status signal is transmitted 340 via the side channel 240 to the processor 120. The transmitter 130 also encrypts and transmits 350 the video data. If the sink/external device does not support the minimum encryption level, a "Fail" status signal is transmitted 360 via the side channel 240 to the processor 120. The transmitter 130 may choose to nevertheless encrypt and transmit 370 the video data, even though the sink/external device will not be able to decrypt the video. It may do this because the determination 330 of the sink/external device's capability may be wrong. Alternately, the transmitter 130 could not transmit 370 the video data. In either case, the video data is not compromised because it is not transmitted using less than the minimum required encryption level.

Figure 4:
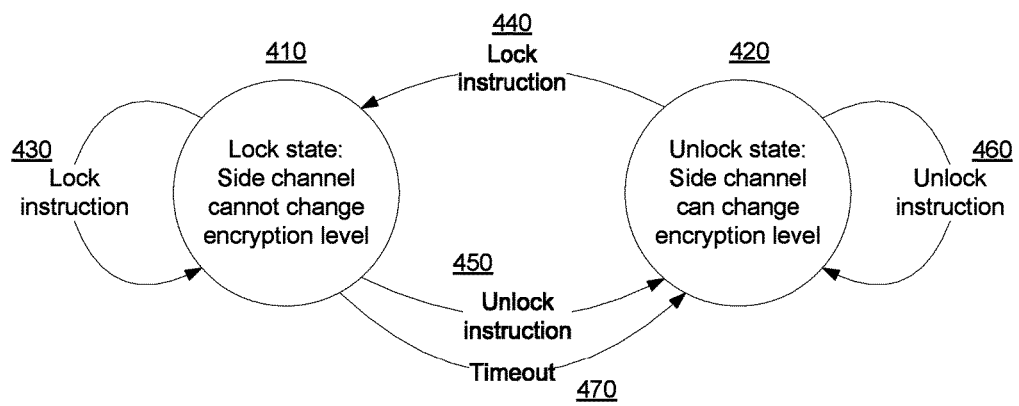
FIG. 4 is a state diagram illustrating locking of encryption level.

FIG. 4 is a state diagram illustrating locking of encryption level. This can be used to maintain overall security in a situation where the encryption control data 124 could be sent via either the more secure internal data channel 122 or via the less secure side channel 240. Two states of the encryption engine 134 are shown in FIG. 4: the lock state 410 and the unlock state 420. In the lock state 410, the encryption engine will follow only encryption control data received via the internal data channel 122 and will ignore encryption control data received via the side channel 240. Thus, the encryption level applied by the encryption engine 134 cannot be changed by the side channel 240. In other words, it can only be changed by the internal data channel 122. In the unlock state 420, the encryption engine will follow encryption control data received via either channel 122, 240 and therefore the encryption level can be changed by either the side channel 240 or by the internal data channel 122.

In addition to the encryption level, the encryption control data can also include a lock instruction 430/440 or an unlock instruction 450/460. These instructions are used to change the lock state of the encryption engine 134. Specifically, in the lock state 410, a lock instruction 430 keeps the encryption engine in the lock state 410. An unlock instruction 450 places the encryption engine in the unlock state 420, but note that an unlock instruction 450 from the side channel 240 will be ignored since the encryption engine is in the lock state. Similarly, in the unlock state 420, an unlock instruction 460 keeps the encryption engine in the unlock state 420, while a lock instruction 440 places the encryption engine to the lock state 410. In addition, the encryption engine 134 may be configured to automatically change 470 from the lock state 410 to the unlock state 420 if no lock/unlock instruction to place or keep the encryption engine in the lock state is received during a predetermined timeout period. In various embodiments, this timeout period is 200 ms, for example.

Figure 5:
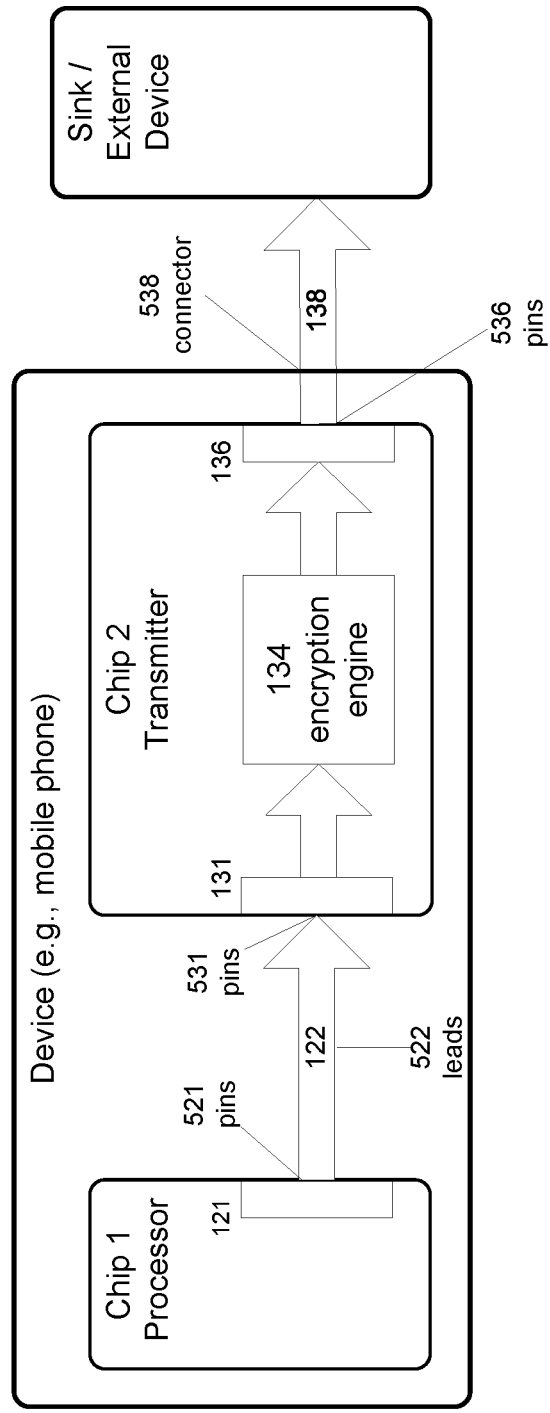
FIG. 5 is a block diagram of one example implementation.

FIG. 5 is a block diagram of one example implementation. In this example, the processor and the transmitter are implemented as separate integrated circuits, or chips. The internal data channel 122 between the processor and the transmitter includes conductive leads 522 coupling pins 521 of the data transmit interface 121 to pins 531 of the data receive interface 131.

Similarly, pins 536 of the data output interface 136 are coupled to an external connection 538 to transmit encrypted video data via the external data channel 138. In the example of FIG. 5, the external connection is made through a mechanical connector 538, for example and HDMI or MHL connector. In an alternative example (not shown), the external connection is made through a wireless connection. Examples of the wireless connection include, but are not limited to, Wi-Fi, Bluetooth, and wireless data connections for mobile phones and tablets, such as various technologies under 3G and LTE.

Figure 6:
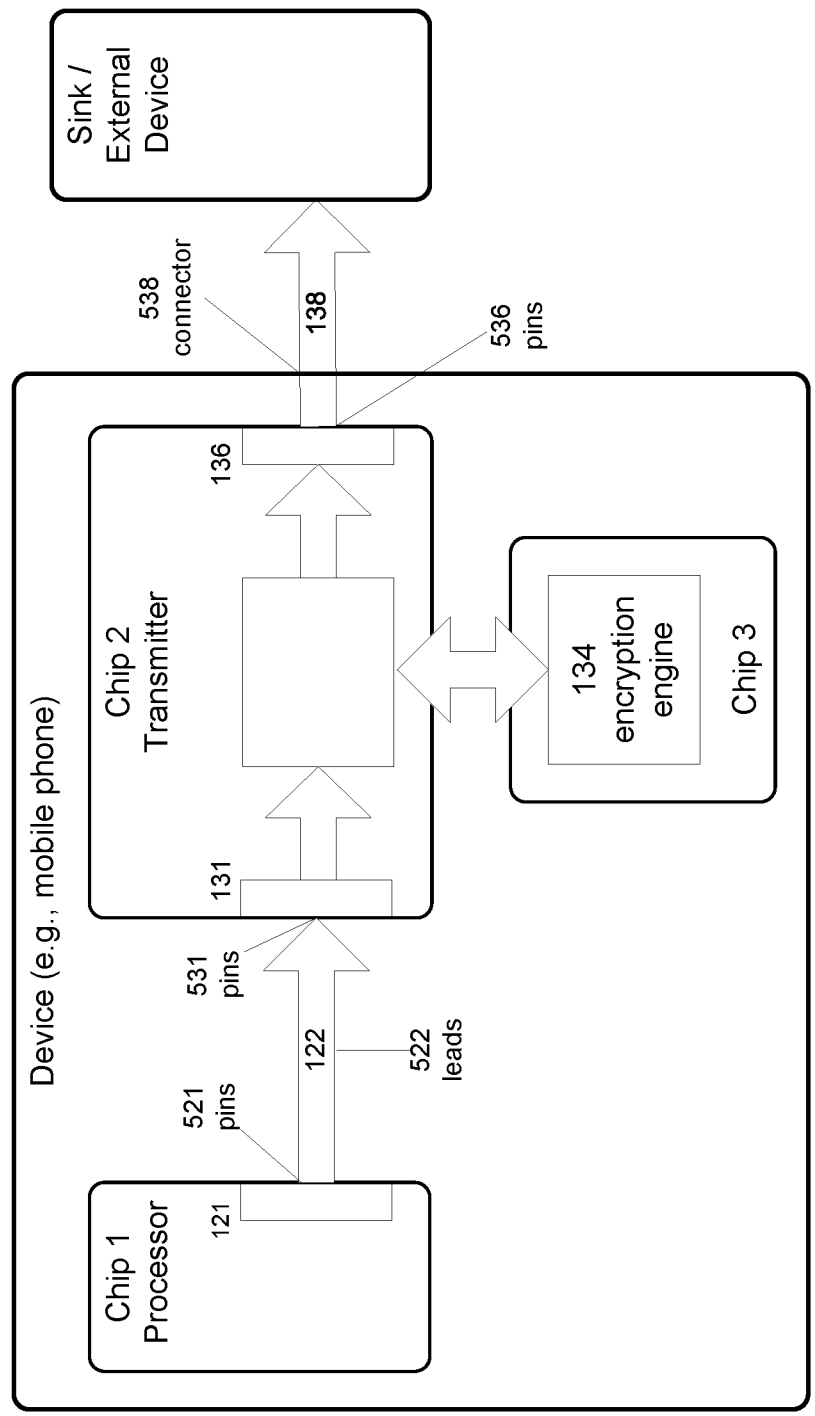
FIG. 6 is a block diagram of another example implementation.

FIG. 6 is a block diagram of another example implementation. In this example, the encryption engine 134 is implemented in a third chip that is separate from the processor and rest of the transmitter. When the transmitter (chip 2) receives the unencrypted video data and encryption control data from the data receive interface 131, it transmits the unencrypted video data and encryption control data to the encryption engine 134 (chip 3) for encryption. After encryption, the encrypted video data is transmitted from the encryption engine 134 back to the transmitter, which then transmits the encrypted video data to the external data channel 138 via the data transmit interface 136.

Although the detailed description contains many specifics, these should not be construed as limiting the scope of the disclosure but merely as illustrating different examples and aspects of the disclosure. It should be appreciated that the scope of the disclosure includes other embodiments not discussed in detail above. Various other modifications, changes and variations which will be apparent to those skilled in the art may be made in the arrangement, operation and details of the method and apparatus of the present disclosure without departing from the spirit and scope of the disclosure as defined in the appended claims. Therefore, the scope of the disclosure should be determined by the appended claims and their legal equivalents.

What is claimed is:

1. In a transmitter comprising a data receive interface having data receive pin(s), a data output interface having data output pin(s), and a control interface having control pin(s), a method for encrypting and transmitting video data, the method comprising:
receiving unencrypted video data and encryption control data from a first data channel via the data receive pin(s) of the data receive interface;
encrypting the unencrypted video data in accordance with the encryption control data;
transmitting the encrypted video data to a second data channel via the data output pin(s) of the data output interface; and
receiving control signals from a side channel that is separate from and lower speed than the first data channel via control pin(s) of the control interface, the control signals controlling at least one of said steps of receiving, encrypting and transmitting.

2. The method of claim 1, wherein the encryption control data specifies a level of encryption used to encrypt the unencrypted video data.

3. The method of claim 2, further comprising:
storing the level of encryption in a register, wherein encrypting the unencrypted video data comprises encrypting the unencrypted video data in accordance with the level of encryption stored in the register.

4. The method of claim 1, wherein the encryption control data specifies whether or not to encrypt the unencrypted video data.

5. The method of claim 1, wherein the encryption control data specifies a minimum level of encryption required to encrypt the unencrypted video data and the encrypted video data is to be transmitted to an external device via the second data channel, the method further comprising:
determining whether the external device supports the required minimum level of encryption; and
if the external device does not support the required minimum level of encryption, then not transmitting data to the external device over the second data channel.

6. The method of claim 1, wherein:
the encryption control data includes lock/unlock instructions that specify a lock state or an unlock state for the encryption;
in a lock state, a level of encryption used to encrypt the unencrypted video cannot be changed by data received via the side channel; and
in an unlock state, the level of encryption used to encrypt the unencrypted video can be changed by data received via the side channel.

7. The method of claim 6, further comprising:
automatically changing from a lock state to an unlock state, if no lock/unlock instruction that specifies the lock state is received during a predetermined timeout period.

8. The method of claim 1, wherein the first data channel is at least 1000 times higher data rate than the side channel.

9. The method of claim 1, further comprising:
transmitting status signal(s) via the control pin(s) to the side channel, the status signal(s) indicating a status of at least one of said steps of receiving, encrypting and transmitting.

10. The method of claim 9, wherein the encryption control data specifies a level of encryption used to encrypt the unencrypted video data and the encrypted video data is to be transmitted to an external device via the second data channel, the method further comprising:
determining whether the external device supports the specified level of encryption; and
the status signal(s) transmitted via the side channel indicates whether the external device supports the specified level of encryption.

11. The method of claim 1, wherein transmitting the encrypted video data complies with the HDMI, MHL or DisplayPort standards, and encrypting the unencrypted video data complies with the HDCP standard.

12. In a processor comprising a data transmit interface having data transmit pin(s) and a control interface having control pin(s), a method for transmitting video data and specifying encryption, the method comprising:
transmitting unencrypted video data and encryption control data to a first data channel via the data transmit pin(s) of the data transmit interface, the encryption control data determining encryption to be applied to the unencrypted video data; and
transmitting control signals to a side channel via the control pin(s) of the control interface, the side channel separate from and lower speed than the first data channel, the control signals controlling operation of a transmitter that transmits the encrypted video data.

13. The method of claim 12, wherein the encryption control data specifies a level of encryption used to encrypt the unencrypted video data.

14. The method of claim 12, wherein the encryption control data specifies whether or not to encrypt the unencrypted video data.

15. The method of claim 12, wherein the encryption control data specifies a minimum level of encryption required to encrypt the unencrypted video data.

16. The method of claim 15, wherein:
the encryption control data includes lock/unlock instructions that specify a lock state or an unlock state for the encryption;
in a lock state, a level of encryption used to encrypt the unencrypted video cannot be changed by data received via the side channel; and
in an unlock state, the level of encryption used to encrypt the unencrypted video can be changed by data received via the side channel.

17. The method of claim 12, wherein the first data channel is at least 1000 times higher data rate than the side channel.

18. The method of claim 12, further comprising:
receiving status signal(s) via the control pin(s) to the side channel, the status signal(s) indicating a status of the transmitter.

19. The method of claim 18, wherein:
the encryption control data specifies a level of encryption used to encrypt the unencrypted video data;
the encrypted video data is to be further transmitted to an external device via a second data channel; and
the status signal(s) received via the side channel indicates whether the external device supports the specified level of encryption.

20. The method of claim 12, wherein the transmitter that transmits the encrypted video data complies with the HDMI, MHL or DisplayPort standards, and the encryption determined by the encryption control data complies with the HDCP standard.

* * * * *